United States Patent Office 3,489,611
Patented Jan. 13, 1970

---

3,489,611
HIGH ENERGY DENSITY ELECTROCHEMICAL SYSTEM
Klaus Braeuer, Long Branch, N.J., assignor to the United States of America as represented by the Secretary of the Army
No Drawing. Filed Apr. 22, 1968, Ser. No. 723,310
Int. Cl. H01m 43/00, 35/00, 17/00
U.S. Cl. 136—6
14 Claims

ABSTRACT OF THE DISCLOSURE

A high energy density electrochemical system is obtained using organic nitrates or nitrites obtained from the reaction of nitric or nitrous acid with an organic alcohol or an organic ester and mixed with an electrically conductive additive as the cathode. The electrolyte used can be an inorganic lithium salt dissolved in an aprotic solvent in which case lithium will be the anode. The electrolyte used can also be an inorganic magnesium or zinc salt dissolved in water or liquid ammonia in which case magnesium or zinc will be the anode.

---

The invention described herein may be manufactured, used, and licensed by or for the Government for governmental purposes without the payment to me of any royalty thereon.

BACKGROUND OF THE INVENTION

This invention relates to a high energy density electrochemical system or battery using organic nitrates or nitrites obtained from the reaction of nitric or nitrous acid with an organic alcohol or an organic ester and mixed with an electrically conductive additive as the cathode.

At present, there is no practical high energy density battery. Zinc-silver and zinc-air systems afford the highest energy density in watt hours per pound but these systems are limited by their theoretical capacities or theoretically obtainable energy densities.

The general object of this invention is to provide a high energy density battery. A more particular object of this invention is to provide such a battery wherein water, liquid ammonia or an aprotic solvent can be used as the electrolyte solvent.

SUMMARY OF THE INVENTION

A high energy density battery is obtained using organic nitrates or nitrites obtained from the reaction of nitric or nitrous acid with an organic alcohol or an organic ester as the cathode active material.

The organic nitrates or nitrites used have the formula R—ONO$_2$ and R—ONO where R is an organic radical having carbon and hydrogen in varying amounts. The nitrates or nitrites may electrochemically react both in the presence and absence of protons according to the equations:

R—ONO$_2$+8H$^+$+8e$^-$→ROH+NH$_3$+2H$_2$O protons present

R—ONO$_2$+8Li$^+$+8e$^-$→ROLi+Li$_3$N+2Li$_2$O aprotic

R—ONO+6H$^+$+6e$^-$→ROH+NH$_3$+H$_2$O protons present

R—ONO+6Li$^+$+6e$^-$→ROLi+Li$_3$N+Li$_2$O aprotic

The organic nitrates and nitrites can be prepared by esterification from organic alcohols and organic esters according to the general equations:

$$\text{ROH} + \text{HNO}_3 \xrightarrow{-\text{H}_2\text{O}} \text{R}-\text{ONO}_2$$

ROOCR' + HNO$_3$ ⟶ R—OHO$_2$ + R'COOH

The organic nitrates used as cathode active materials may also be polymeric nitrates which are prepared according to the following known method:

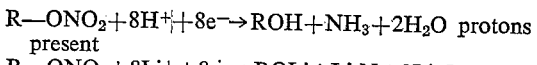

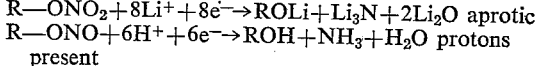

The polymeric nitrites can also be used as cathode active materials and are prepared in an analogous manner.

The capacities of cathodes containing organic nitrates or nitrites as the cathode active materials are very high. For example, polyvinyl-di-nitrate with a molecular weight of 150 and an equivalent weight of 9.4, has a capacity of 10,270 coulombs per gram or 2.85 ampere hours per gram. Then, cellulose-di-nitrate with a molecular weight of 250 and an equivalent weight of 15.6, has a capacity of 6180 coulombs per gram or 1.72 ampere hours per gram. Cellulose-tri-nitrate of molecular weight of 297 and of equivalent weight of 12.4, has a capacity of 7790 coulombs per gram or 2.16 ampere hours per gram.

The cathodes may be prepared by mixing the cathode active materials, that is, the organic nitrates and/or organic nitrites with conductive additives such as graphite or carbon black. Alternatively, thin films of the cathode material may be deposited on a conductive substrate.

To complete the electrochemical system or high energy density battery one can use lithium as the anode and an inorganic lithium salt dissolved in an aprotic solvent as the electrolyte. Examples of such electrolytes are solutions of about 5 to 50 percent by weight of lithium perchlorate in aprotic solvents such as propylene carbonate, ethylene-carbonate, tetrahydrofuran, nitromethane, dimethylsulfoxide, butyrolactone, ethyl-acetate, etc. In such an electrochemical system, the anode is made by conventional means as for example, by pressing lithium ribbon onto a copper screen. A separator such as cellulose, nonwoven polypropylene fiber or nonwoven glass fiber separates the anode and cathode. Individual cell units can be stacked to form the high energy density battery as is well known in the art.

The electrochemical system can also be completed using magnesium as the anode with about 5 to 50 percent by weight of an inorganic magnesium salt such as magnesium bromide, magnesium perchlorate, or magnesium thiocyanate dissolved in water or liquid ammonia as the electrolyte. Zinc can also be used as the anode in which case, the electrolyte is about 5 to 50 percent by weight of an inorganic zinc salt such as zinc chloride dissolved in water or liquid ammonia.

It is also possible to replace manganese dioxide as the cathode active material in the Leclanche cell with organic nitrates and/or organic nitrites. In such a case, Zn would be the anode and an aqueous solution of ammonium chloride the electrolyte.

The high energy density batteries described herein are further characterized by a long shelf life and low cost.

The foregoing is to be considered merely as illustrative of the invention and not in limitation thereof.

What is claimed is:

1. A high density battery including:
   at least one member of the group consisting of polyvinyl nitrate, polyvinyl nitrite, cellulose nitrate, and cellulose nitrite mixed with an electrically conductive additive as the cathode,
   a metal being a member of the group consisting of lithium, magnesium and zinc as the anode, and a solution of an inorganic salt of said anode-forming metal as the electrolyte.

2. A high energy density battery including
(A) at least one member of the group consisting of polyvinyl nitrate, polyvinyl nitrite, cellulose nitrate, and celluose nitrite mixed with an electrically conductive additive as the cathode,
(B) an inorganic lithium salt dissolved in an aprotic solvent as the electrolyte, and
(C) lithium as the anode.

3. A high energy density battery including
(A) at least one member of the group consisting of polyvinyl nitrate, polyvinyl nitrite, cellulose nitrate, and cellulose nitrite mixed with an electrically conductive additive as the cathode,
(B) an inorganic magnesium salt dissolved in a solvent taken from the group consisting of water and liquid ammonia as the electrolyte, and
(C) magnesium as the anode.

4. A high energy density battery including
(A) at least on member of the group consisting of polyvinyl nitrate, polyvinyl nitrite, cellulose nitrate, and cellulose nitrite mixed with an electrically conductive additive as the cathode,
(B) an inorganic zinc salt dissolved in a solvent taken from the group consisting of water and liquid ammonia as the electrolyte, and
(C) zinc as the anode.

5. A high energy density battery including
(A) at least one member of the group consisting of polyvinyl nitrate, polyvinyl nitrite, cellulose nitrate, and cellulose nitrite mixed with an electrically conductive additive as the cathode,
(B) an aqueous solution of ammonium chloride as the electrolyte, and
(C) zinc as the anode.

6. A high energy density battery according to claim 2 wherein the inorganic lithium salt is lithium perchlorate and the aprotic solvent is taken from the group consisting of propylene carbonate, ethylene carbonate, tetrahydrofuran, nitromethane, dimethylsulfoxide, butyrolactone, and ethyl acetate.

7. A high energy density battery according to claim 3 wherein the inorganic magnesium salt is taken from the group consisting of magnesium bromide, magnesium perchlorate, and magnesium thiocyanate.

8. A high energy density battery according to claim 4 wherein the inorganic zinc salt is zinc chloride.

9. A high energy density battery according to claim 2 wherein the nitrate is a polymeric nitrate selected from the group consisting of polyvinyl nitrate, cellulose trinitrate, and cellulose dinitrate.

10. A high energy density battery according to claim 6 wherein the nitrate is a polymeric nitrate selected from the group consisting of polyvinyl nitrate, cellulose trinitrate, and cellulose dinitrate.

11. A high energy density battery according to claim 3 wherein the nitrate is a polymeric nitrate selected from the group consisting of polyvinyl nitrate, cellulose trinitrate, and cellulose dinitrate.

12. A high energy density battery according to claim 7 wherein the nitrate is a polymeric nitrate selected from the group consisting of polyvinyl nitrate, cellulose trinitrate, and cellulose dinitrate.

13. A high energy density battery according to claim 4 wherein the nitrate is a polymeric nitrate selected from the group consisting of polyvinyl nitrate, cellulose trinitrate, and cellulose dinitrate.

14. A high energy density battery according to claim 8 wherein the nitrate is a polymeric nitrate selected from the group consisting of polyvinyl nitrate, cellulose trinitrate, and cellulose dinitrate.

References Cited

UNITED STATES PATENTS

| | | | |
|---|---|---|---|
| 2,976,342 | 3/1961 | Morehouse et al. | |
| 2,996,562 | 8/1961 | Meyers | 136—6 |
| 3,117,032 | 1/1964 | Panzer | 136—100 |
| 3,185,590 | 5/1965 | Mayer et al. | 136—6 |
| 3,248,265 | 4/1966 | Herbert | 136—6 |
| 3,303,054 | 2/1967 | Gruber et al. | 136—100 |
| 3,330,701 | 7/1967 | McElhill et al. | 136—100 |
| 3,352,720 | 11/1967 | Wilson et al. | 136—100 |
| 3,413,154 | 11/1968 | Rao | 136—100 |

WINSTON A. DOUGLAS, Primary Examiner

C. F. LEFEVOUR, Assistant Examiner

U.S. Cl. X.R.

136—20, 100